G. F. BECHER.
Portable Fences.

No. 141,750.            Patented August 12, 1873.

Witnesses.
Ernst Bilhuber.
Chas. Wahlers.

Inventor.
Gustav F. Becher
by VanSantvoord & Hauff
his att'ys

UNITED STATES PATENT OFFICE.

GUSTAV F. BECHER, OF BROOKLYN, NEW YORK.

IMPROVEMENT IN PORTABLE FENCES.

Specification forming part of Letters Patent No. 141,750, dated August 12, 1873; application filed June 6, 1873.

*To all whom it may concern:*

Be it known that I, GUSTAV F. BECHER, of Brooklyn, in the county of Kings and State of New York, have invented a new and Improved Portable Fence; and I do hereby declare the following to be a full, clear, and exact description thereof, which will enable those skilled in the art to make and use the same, reference being had to the accompanying drawing forming part of this specification, in which drawing—

Figure 1:
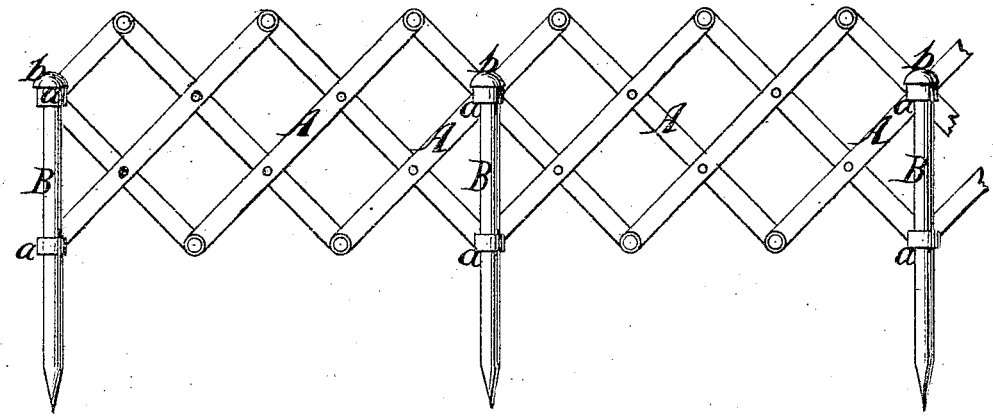
Figure 2:
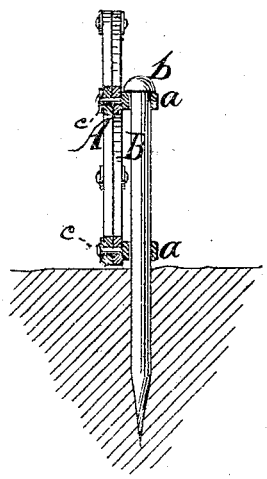

Figure 1 represents a side elevation of my fence as it appears when in position in the ground. Fig. 2 is a transverse vertical section of the same.

Similar letters indicate corresponding parts.

This invention relates to a fence composed of a series of lazy-tongs; and it consists in the arrangement of stakes secured on such fence by means of guides or holders and serving to support the same on the ground in such a manner that the fence can be put up and taken down with facility, and that the same can be drawn out or pushed together, and thus be made to accommodate itself to any size of border, or that it can be packed up in a small compass.

In the drawing, the letters A A designate a series of lazy-tongs, which are pivoted together in the usual manner and form the body or structure of my fence. At intervals upon said fence are stakes or posts B B, which are held by guides or eye-bolts *a a*, which are provided with shanks or extensions *c*, so that the same serve to connect the bars of the lazy-tongs together when secured in place. The stakes B B are provided with heads or stops *b*, which rest on the guides *a* and thereby hold the fence down on the ground.

My fence is intended particularly for garden-borders, lawns, &c., where an extendible and removable fence is of great value, as the garden or plot can then be enlarged and contracted every season; and, besides, my fence can be taken down in rough weather with very little trouble, or taken down altogether in winter, whereby a great saving in material is effected, the fence being then exempted from the deteriorating action of the elements.

What I claim as new, and desire to secure by Letters Patent, is—

The pivoted eye-bolts *a c*, secured to the side of a series of lazy-tongs, A, in combination with the stakes B, substantially as and for the purpose specified.

This specification signed by me this 3d day of June, 1873.

GUSTAV F. BECHER.

Witnesses:
ANDREW KISSEHTOCH,
W. HAUFF.